United States Patent
Narikawa et al.

(10) Patent No.: US 11,112,687 B2
(45) Date of Patent: Sep. 7, 2021

(54) PROJECTOR, PROJECTION CONTROL METHOD, AND STORAGE MEDIUM

(71) Applicant: CASIO COMPUTER CO., LTD., Tokyo (JP)

(72) Inventors: Tetsuro Narikawa, Hamura (JP); Yubi Takashimada, Ome (JP); Kiyoshi Oda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/844,525

(22) Filed: Apr. 9, 2020

(65) Prior Publication Data
US 2020/0326618 A1 Oct. 15, 2020

(30) Foreign Application Priority Data

Apr. 11, 2019 (JP) .............................. JP2019-075667
Apr. 17, 2019 (JP) .............................. JP2019-078237

(51) Int. Cl.
*G03B 21/20* (2006.01)
*H04N 9/31* (2006.01)
*G02B 26/00* (2006.01)

(52) U.S. Cl.
CPC ......... *G03B 21/204* (2013.01); *G02B 26/008* (2013.01); *G03B 21/206* (2013.01); *G03B 21/2053* (2013.01)

(58) Field of Classification Search
CPC G03B 21/204; G03B 21/2053; G03B 21/206; H04N 9/3114; H04N 9/3158; H04N 9/3161; H04N 9/3164
See application file for complete search history.

(56) References Cited

U.S. PATENT DOCUMENTS

| 7,311,404 B2 * | 12/2007 | Hori .................... H04N 9/3114 348/743 |
| 9,348,203 B2 * | 5/2016 | Mueller ................ F21S 10/007 |

(Continued)

FOREIGN PATENT DOCUMENTS

| CN | 106249522 A | 12/2016 |
| CN | 109143746 A | 1/2019 |

(Continued)

OTHER PUBLICATIONS

JPO; Application No. 2019-078237; Notice of Reasons for Refusal dated Feb. 25, 2021.

(Continued)

*Primary Examiner* — Bao-Luan Q Le
(74) *Attorney, Agent, or Firm* — Fitch, Even, Tabin & Flannery LLP

(57) ABSTRACT

A projector is provided which includes a first light source device configured to emit light in a first wavelength range, a first wheel having formed thereon a plurality of light source segments configured to emit lights in different wavelength ranges upon receiving light in the first wavelength range, a second wheel having formed thereon a plurality of areas configured to dim light emitted from the first wheel, a display device onto which light emitted from the second wheel is shined to thereby form image light, and a processor configured to control the first light source device, the first wheel and the second wheel in a synchronized fashion, wherein the processor performs a masking process on the image light when either or both of a rotation frequency difference and a phase shift between the first and the second wheels are predetermined thresholds or greater.

20 Claims, 8 Drawing Sheets

(56) References Cited

U.S. PATENT DOCUMENTS

| | | | |
|---|---|---|---|
| 9,544,554 B2* | 1/2017 | Murai | G03B 21/2086 |
| 9,544,581 B2* | 1/2017 | Simon | H04N 9/3158 |
| 9,832,433 B2* | 11/2017 | Cui | H04N 9/3194 |
| 10,006,610 B2* | 6/2018 | Cui | G02B 26/008 |
| 10,234,108 B2* | 3/2019 | Cui | G03B 21/204 |
| 10,260,709 B2* | 4/2019 | Cui | G03B 21/204 |
| 10,542,240 B2* | 1/2020 | Murakami | H04N 9/3158 |
| 10,921,702 B2* | 2/2021 | Inoue | H04N 9/3164 |
| 2001/0055081 A1 | 12/2001 | Shigeta | |
| 2005/0206855 A1* | 9/2005 | Hori | H04N 9/3114 353/84 |
| 2005/0212980 A1* | 9/2005 | Miyazaki | H04N 9/315 348/744 |
| 2008/0174744 A1* | 7/2008 | Myoung | G03B 33/08 353/84 |
| 2014/0176914 A1* | 6/2014 | Mueller | G02B 26/008 353/31 |
| 2015/0109584 A1* | 4/2015 | Murai | H04N 9/3161 353/31 |
| 2015/0237340 A1* | 8/2015 | Simon | G03B 21/208 348/51 |
| 2016/0316183 A1* | 10/2016 | Cui | H04N 9/3194 |
| 2018/0051865 A1* | 2/2018 | Cui | G03B 33/08 |
| 2018/0224089 A1* | 8/2018 | Cui | H04N 9/3114 |
| 2018/0259158 A1* | 9/2018 | Cui | H04N 9/3158 |
| 2019/0033695 A1* | 1/2019 | Yanase | G03B 21/208 |
| 2019/0199981 A1* | 6/2019 | Murakami | G03B 21/008 |
| 2019/0212641 A1* | 7/2019 | Inoue | G03B 21/204 |
| 2020/0319540 A1* | 10/2020 | Kato | G02B 27/0068 |

FOREIGN PATENT DOCUMENTS

| | | |
|---|---|---|
| JP | 2002-006395 A | 1/2002 |
| JP | 2005-266324 A | 9/2005 |
| JP | 2009-104141 A | 5/2009 |
| JP | 2015-132727 A | 7/2015 |
| JP | 2017-003643 A | 1/2017 |
| JP | 2017-198942 A | 11/2017 |
| JP | 2018-045199 A | 3/2018 |
| JP | 2018-136508 A | 8/2018 |
| JP | 2019-008193 A | 1/2019 |
| WO | 2018116414 A1 | 6/2018 |

OTHER PUBLICATIONS

JPO; Application No. 2019-075667; Notice of Reasons for Refusal dated Mar. 11, 2021.
CNIPA; Application No. 202010229875.4; Office Action dated Jul. 5, 2021.

* cited by examiner

PROJECTOR, PROJECTION CONTROL METHOD, AND STORAGE MEDIUM

CROSS-REFERENCE TO RELATED APPLICATION

This patent application is based upon and claims the benefit of priority under 35 USC 119 from Japanese Patent Application No. 2019-075667 filed on Apr. 11, 2019 and Japanese Patent Application No. 2019-078237 filed on Apr. 17, 2019, the entire disclosures of which, including the specifications, claims, drawings, and abstracts thereof, are incorporated herein by reference in its entirety.

BACKGROUND OF THE INVENTION

Field of the Invention

The present invention relates to a projector, a projection control method, and a storage medium.

Description of the Related Art

Conventionally, there has been proposed a projector in which an image formed by use of a micromirror display device called a digital micromirror device (DMD) or a liquid crystal panel is projected on to a screen. For instance, a projector disclosed in Japanese Patent Laid-Open No. 2018-45199 includes blue laser diodes, a red light source, a luminescent wheel, and a color wheel. A green luminescent material and a red luminescent material are provided on the luminescent wheel, and the color wheel includes a blue segment, a green segment, and a red segment which are formed as dichroic filters. The green luminescent material and the red luminescent material are excited by light having a wavelength in the blue wavelength range or simply light in the blue wavelength range emitted from the blue laser diodes to emit light having a wavelength in the green wavelength range or simply light in the green wavelength rage and light having a wavelength range in the red wavelength rage or simply light in the red wavelength range, respectively. Light in the blue wavelength range, light in the green wavelength range and light in the red wavelength range which are emitted respectively from the blue laser diodes, the luminescent wheel and the red light source are dimmed respectively on the blue segment, the green segment and the red segment to be guided towards a display device.

In the projector configured in the way described above, the luminescent wheel and the color wheel are caused to rotate in synchronism with each other, and a color image is projected by the colors are switched over in time division. Additionally, the projector outputs a projected image synchronized with an input image by synchronizing the individual wheels with a frame rate of the input image. Consequently, when the frame rate of the input image changes as a result of a video signal generated when a video tape is quickly fed or rewound, or is temporarily stopped or a video signal from an HDMI (a registered trademark), a D-Port or the like which can cope with a variable frame rate is inputted, rotational frequencies of the luminescent wheel and the color wheel also change so as to be synchronized with the frame rate.

However, it may sometimes be difficult for the luminescent wheel and the color wheel to change their rotational frequencies while being kept synchronized with each other. For example, in the case that an image is projected with a phase shift occurring between the luminescent wheel and the color wheel, a color of light which differs from an intended color by the input image is emitted, and a projected image looks like flickering, whereby the projected image is not projected properly.

SUMMARY OF THE INVENTION

The present invention has been made in view of the situations described above, and an object of the present invention is to provide a projector, a projection control method, and a storage medium that can reduce the flickering of a projected image.

According to an aspect of the present invention, there is provided a projector including:
a first light source device configured to emit light in a first wavelength range;
a first wheel on which a plurality of light source segments are formed, the plurality of light source segments being configured to emit lights in different wavelength ranges upon receiving light in the first wavelength range shined thereon;
a second wheel on which a plurality of areas are formed, the plurality of areas being configured to dim light emitted from the first wheel;
a display device onto which light emitted from the second wheel is shined to thereby form image light; and
a processor configured to control the first light source device, the first wheel and the second wheel in a synchronized fashion,
wherein the processor performs a masking process on the image light when either or both of a rotation frequency difference and a phase shift between the first wheel and the second wheel are equal to or greater than predetermined thresholds.

According to another aspect of the present invention, there is provided a projection control method for a projector, the projector including:
a first light source device configured to emit light in a first wavelength range;
a first wheel on which a plurality of light source segments are formed, the plurality of light source segments being configured to emit lights in different wavelength ranges upon receiving light in the first wavelength range shined thereon;
a second wheel on which a plurality of areas are formed, the plurality of areas being configured to dim light emitted from the first wheel; and
a display device onto which light emitted from the second wheel is shined to thereby form image light;
the projection control method including:
a processor configured to control the first light source device, the first wheel and the second wheel in a synchronized fashion and to perform a masking process on the image light when either or both of a rotation frequency difference and a phase shift between the first wheel and the second wheel are equal to or greater than predetermined thresholds.

According to a further aspect of the present invention, there is provided a storage medium that can be read by a computer,
the computer including:
a first light source device configured to emit light in a first wavelength range;
a first wheel on which a plurality of light source segments are formed, the plurality of light source segments being configured to emit lights in different wavelength ranges upon receiving light in the first wavelength range shined thereon;

a second wheel on which a plurality of areas are formed, the plurality of areas being configured to dim light emitted from the first wheel; and a display device onto which light emitted from the second wheel is shined to thereby form image light;

the storage medium configured to cause the computer to function as a processor configured to control the first light source device, the first wheel and the second wheel in a synchronized fashion and to perform a masking process on the image light when either or both of a rotation frequency difference and a phase shift between the first wheel and the second wheel are equal to or greater than predetermined thresholds.

DETAILED DESCRIPTION OF THE PREFERRED EMBODIMENT

Figure 1:
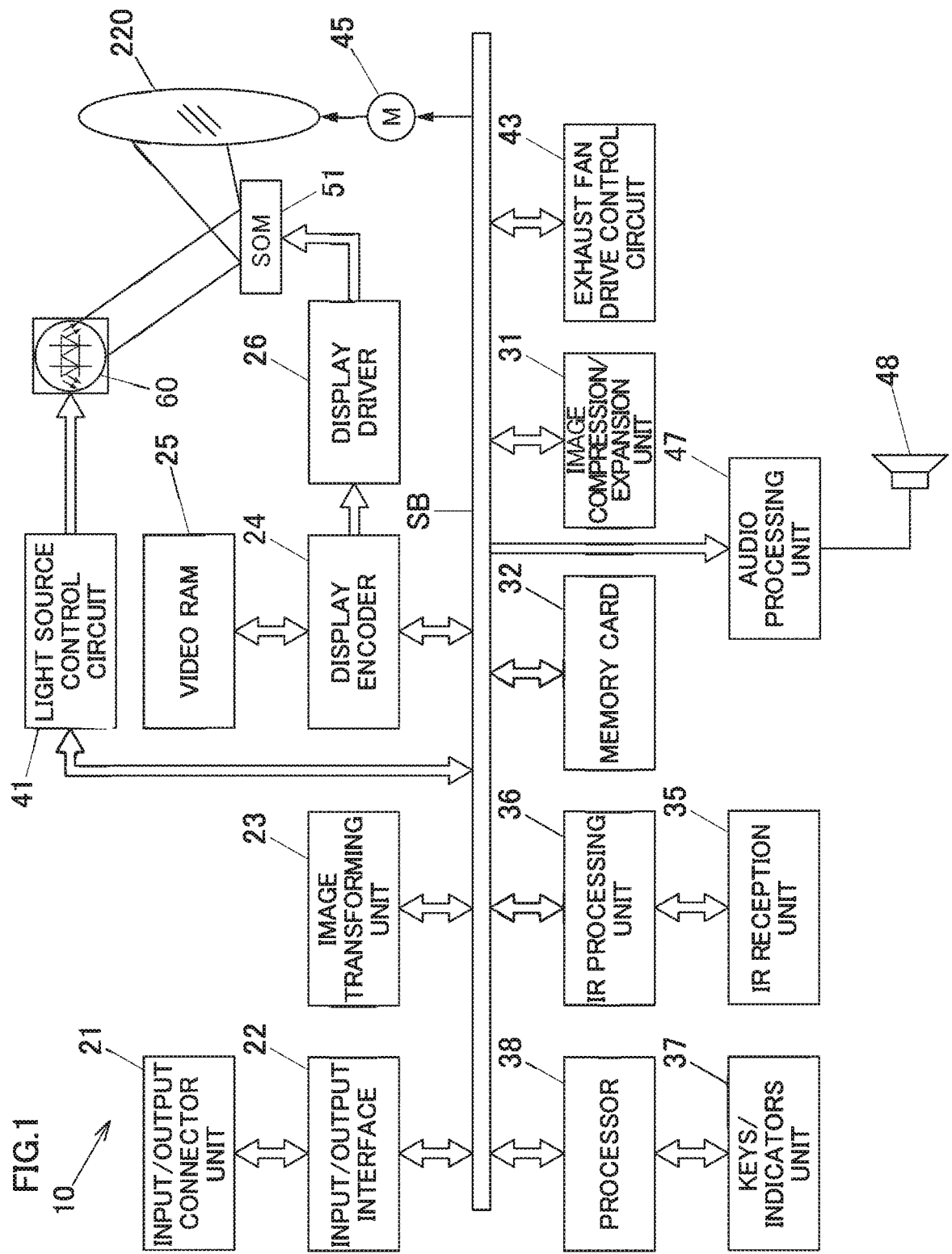
FIG. 1 is a functional circuit block diagram of a projector according to an embodiment of the present invention.

Hereinafter, a mode for carrying out the present invention will be described. FIG. 1 is a functional block diagram of a projector 10 according to an embodiment of the present invention. The projector 10 includes a processor 38, an input/output interface 22, an image transforming unit 23, a display encoder 24, a display driver 26, and the like. Image signals of various standards which are inputted from an input/output connector unit 21 are sent to the image transforming unit 23 via the input/output interface 22 and a system bus SB, and the image signals so sent are transformed to be unified into an image signal of a predetermined format which is suitable for display in the image transforming unit 23. Thereafter, the unified image signal is outputted to the display encoder 24.

The display encoder 24 deploys the image signal inputted thereinto on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate corresponding to the image signal outputted from the display encoder 24. In the projector 10, a pencil of light emitted from a light source unit 60 is shined on to the display device 51 via a light guiding optical system, whereby image light is formed by reflected light from the display device 51, and an image is projected on to a screen, not shown, via a projection optical system 220 for display on the screen. A movable lens group of the projection optical system 220 can be driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23. Thus, the image compression/expansion unit 31 can display dynamic images based on the image data stored in the memory card 32.

The processor 38 governs the control of operations of individual circuitries inside the projector 10 and includes CPU as an arithmetic-logic unit, ROM that stores fixedly operation programs such as various settings, RAM that is used as a work memory, and the like.

A keys/indicators unit 37 is made up of keys and indicators that are provided on a casing of the projector 10. Operation signals from the keys/indicators unit 37 are sent out directly to the processor 38. Key operation signals from a remote controller are received by an IR reception unit 35 and are then demodulated into a code signal at an Ir processing unit 36 for output to the processor 38.

The processor 38 is connected with an audio processing unit 47 by way of the system bus SB. This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The processor 38 controls a light source control circuit 41. The light source control circuit 41 controls separately operations of an excitation light shining device 70, a red light source device 120 and the like of the light source unit 60 so that light in predetermined wavelength ranges required in generating an image is emitted from the light source unit 60. Additionally, the light source control circuit 41 controls a synchronizing timing of a luminescent wheel 101 and a color wheel 201 based on a command from the processor 38.

Additionally, the processor 38 causes an exhaust fan drive control circuit 43 to detect temperatures with a plurality of temperature sensors which are provided in the light source unit 60 and the like so as to control revolution speeds of a exhaust fans based on the results of the temperature detections. Further, the processor 38 also causes the exhaust fan drive control circuit 43 to keep the exhaust fans revolving by use of a timer or the like even after a power supply to a main body of the projector 10 is switched off. Alternatively, the processor 38 causes the exhaust fan drive control circuit 43 to switch off the power supply to the main body of the projector 10 depending upon the results of the temperature detections by the temperature sensors.

Figure 2:
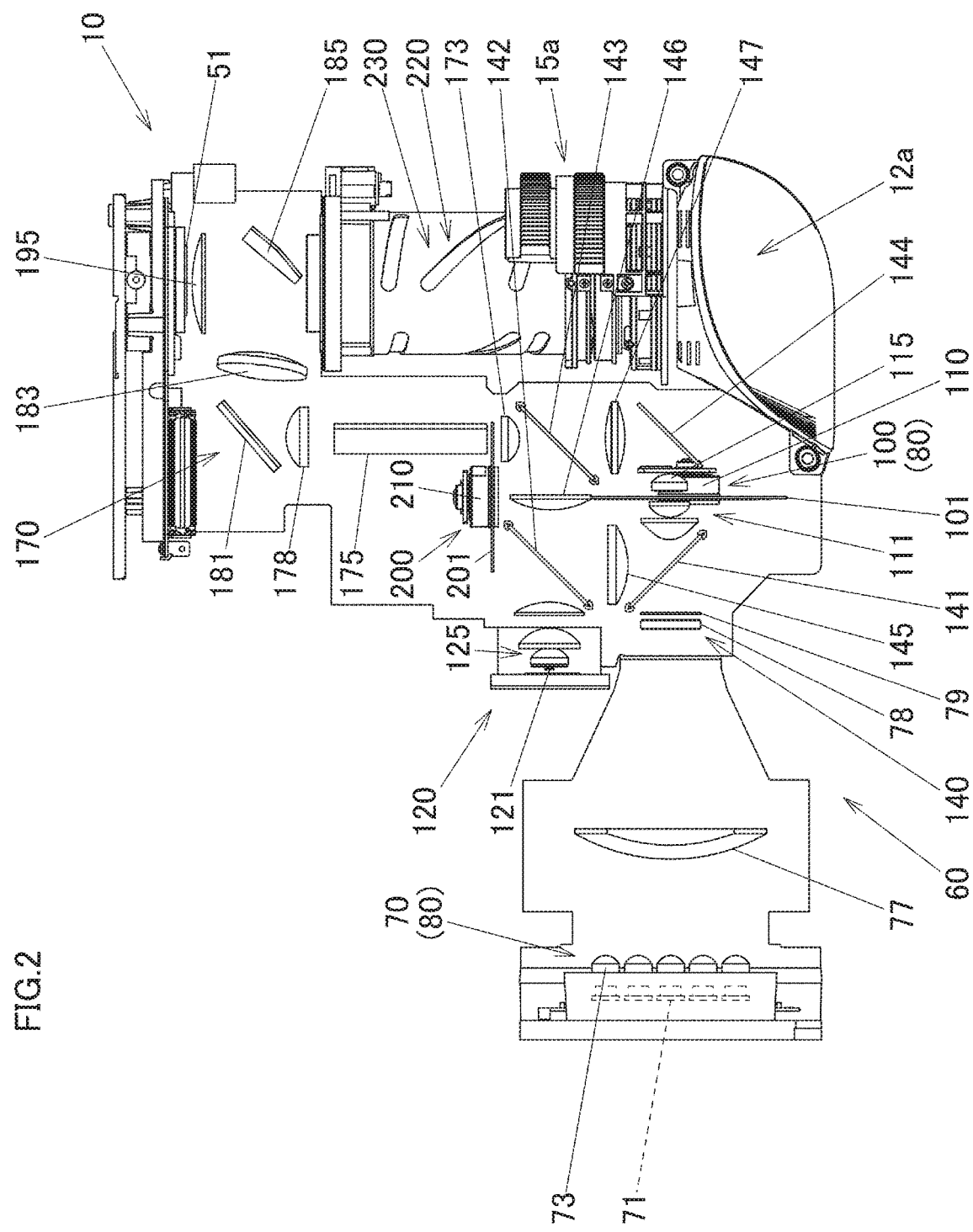
FIG. 2 is a plan view showing an internal structure of the projector according to the embodiment of the present invention.

FIG. 2 is a schematic plan view illustrating an internal structure of the projector 10. The projector includes the light source unit 60, a light source side optical system 170, the projection optical system. 220, and the like. The projector 10 is connected with a power supply circuit block, a light source control block, and the like to drive driven parts (the excitation light shining device 70, the red light source device 120, a luminescent wheel device 100, a color wheel device 200, and the like) within the light source unit 60.

The light source unit 60 includes the excitation light shining device 70, which constitutes not only a light source for light having a wavelength in the blue wavelength range or simply light in the blue wavelength range (light in a first wavelength range) but also an excitation light source, a green light source device 80, which constitutes a light source for light having a wavelength in the green wavelength or simply light in the green wavelength range (light in a second wavelength range), the red light source device 120, which constitutes alight source for light having a wavelength in the red wavelength range or simply light in the red wavelength range (light in a third wavelength range), and the color wheel device 200. The green light source device 80 is made up of the excitation light shining device 70 and the luminescent wheel device 100.

A light guiding optical system 140 is disposed in the light source unit 60, and this light guiding optical system 140 guides lights in the red, green and blue wavelength ranges. The light guiding optical system 140 guides lights emitted, respectively, from the excitation light shining device 70, the green light source device 80, and the red light source device 120 to the light source side optical system 170.

The excitation light shining device 70 is disposed near a front panel of the projector 10. The excitation light shining device 70 includes a light source group made up of a plurality of blue laser diodes 71 (a first light source device), collective lenses 77, 78, and a diffuse plate 79. The blue laser diodes 71 are semiconductor light emitting devices and are disposed so that axes of lights emitted from the blue laser diodes 71 become parallel to an optical axis of a red light emitting diode 121.

The light source group is formed by disposing the plurality of blue laser diodes 71 into a matrix configuration. Collimator lenses 73 are disposed individually on optical axes of the blue laser diodes 71 to convert lights emitted from the corresponding blue laser diodes 71 into parallel lights in order to enhance the directivity of the lights so emitted. The collective lens 77 and the collective lens 78 collect pencils of light emitted from the blue laser diodes 71 in one direction and emit the pencils of light so contracted to the diffuse plate 79. The diffuse plate 79 transmits diffusely the pencils of light in the blue wavelength range which are incident thereon towards a first dichroic mirror 141 disposed on a side of the diffuse plate 79 that faces the luminescent wheel 101. The excitation light shining device 70 is cooled by a heat sink, not shown, or the like.

The luminescent wheel device 100 is disposed on an optical path of excitation light emitted from the excitation light shining device 70. The luminescent wheel device 100 includes the luminescent wheel 101, a motor 110, a collective lens group 111, and a collective lens 115. An upper portion of the luminescent wheel 101 is disposed between the collective lens group 111 and the collective lens 115 and is disposed so as to be at right angles to an axis of light emitted from the excitation light shining device 70. The luminescent wheel 101 is driven to rotate by the motor 110.

Figure 3A:
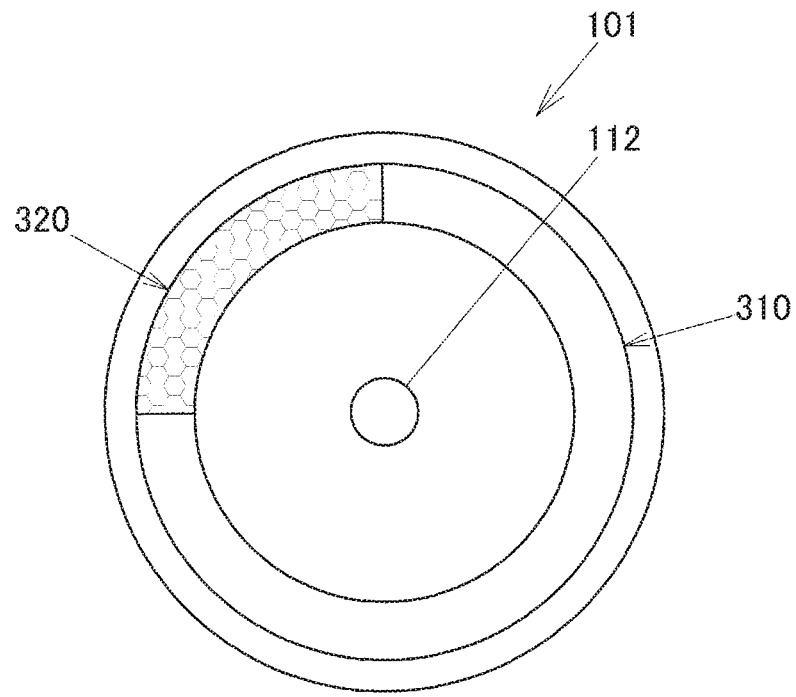
FIG. 3A is a drawing showing a luminescent wheel of the projector according to the embodiment of the present invention.

The luminescent wheel 101 (a first wheel) has a circular disk shape as shown in FIG. 3A and can rotate by being driven by the motor 110 which is connected to the luminescent wheel 101 via a bearing 112. The luminescent wheel 101 includes, as a plurality of light source segments, a luminescent light emitting area 310 and a transmission area 320 (a first transmission area) which are provided to be aligned end to end in a circumferential direction on the luminescent wheel 101. A metallic base material such as copper or aluminum can be used as a base material for the luminescent wheel 101. A surface of the base material that is oriented towards the excitation light shining device 70 is mirror finished through silver deposition or the like. A green luminescent material layer formed on the mirror finished surface of the base material is formed on the luminescent light emitting area 310. The luminescent light emitting area 310 receives light in the blue wavelength range emitted from the excitation light shining device 70 as excitation light and then emits luminescent light in the green wavelength range in every direction. The luminescent light in the green wavelength range is incident on the collective lens group 111 disposed on a side of the luminescent wheel 101 that faces the first dichroic mirror 141 from the luminescent wheel device 100.

The transmission area 320 of the luminescent wheel 101 can be formed by fitting a transparent base material having a light transmission characteristic in a cut-out portion formed in the base material of the luminescent wheel 101. The transparent base material is formed of a transparent material such as glass or resin. Additionally, a diffuse layer may be provided on a surface of a side of the transparent base material onto which light in the blue wavelength range is shined or an opposite side thereto. The diffuse layer can be provided by forming minute irregularities on the relevant surface of the transparent base material through sandblasting. Light in the blue wavelength range emitted from the excitation light shining device 70 to be incident on the transmission area 320 is transmitted or transmitted diffusely through the transmission area 320 and is then incident on the collective lens 115. A marker is formed on the luminescent wheel 101 to allow a rotation of the luminescent wheel to be detected (not shown). This marker can be formed on the surface of the luminescent wheel 101 on which the luminescent light emitting area 310 is formed (in other words, the surface on which light in the blue wavelength range is incident) or a surface of the luminescent wheel 101 which lies opposite to the surface on which the luminescent light emitting area 310 is formed (in other words, a surface opposite to the surface on which light in the blue wavelength range is incident). Additionally, the marker can be formed as a non-reflecting portion whose light reflectance is lower than that of the base material of the luminescent wheel 101. The processor 38 acquires a detection signal by detecting the marker with an appropriate sensor such as a reflective light sensor to obtain a rotation frequency or a synchronizing point of the luminescent wheel 101 from an interval or timing of the detection signal.

The collective lens group 111 collects pencils of light in the blue wavelength range emitted from the excitation light shining device 70 to the luminescent wheel 101 and collects luminescent light emitted from the luminescent wheel 101. The collective lens 115 collects a pencil of light passing through to be emitted from the luminescent wheel 101.

The red light source device 120 includes the red light emitting diode 121 (a second light source device), which is a semiconductor light emitting device, disposed in such a manner that an axis of light emitted therefrom becomes parallel to optical axes of the blue laser diodes 71 and a collective lens group 125 that configured to collect light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by the first dichroic mirror 141. The red light source device 120 is cooled by a heat sink and the like, which are not shown.

The light guiding optical system 140 includes the first dichroic mirror 141, a second dichroic mirror 142, a third dichroic mirror 143, collective lenses 145, 146, 147 that collect pencils of light, a reflection mirror 144 that turns an axis of light in the blue wavelength range towards the third dichroic mirror 143, and the like. Hereinafter, the individual constituent members will be described.

The first dichroic mirror 141 is disposed between the diffuse plate 79 and the collective lens group 111. The first dichroic mirror 141 transmits light in the blue wavelength range towards the collective lens group 111 and reflects light in the green wavelength range in the direction of the collective lens 145 to thereby turn an axis of the light in the green wavelength range through 90 degrees.

The light in the green wavelength range reflected on the first dichroic mirror 141 is collected by the collective lens 145 and is then incident on the second dichroic mirror 142. The second dichroic mirror 142 constitutes a combining device that combines light in the green wavelength range and light in the red wavelength range into the same light axis and reflects light in the green wavelength range, while transmitting light in the red wavelength range.

The light in the green wavelength range reflected by the second dichroic mirror 142 is collected by the collective lens 146 and is then incident on the third dichroic mirror 143. The third dichroic mirror 143 reflects light in the red wavelength range and light in the green wavelength range and transmits light in the blue wavelength range. Consequently, the third dichroic mirror 143 reflects the light in the red wavelength range and the light in the green wavelength range that the collective lens 146 collects to the collective lens 173, so that the third dichroic mirror 143 guides the light in the red wavelength range and the light in the green wavelength range in the way described above.

When a light shining area on the luminescent wheel 101 onto which light in the blue wavelength range is shined stays on the transmission area, light in the blue wavelength range emitted from blue laser diodes 71 is transmitted through the luminescent wheel 101 and is then collected by the collective lens 115 to thereafter be guided to the reflection mirror 144. The reflection mirror 144 is disposed on an axis of light in the blue wavelength range that is transmitted or transmitted diffusely through the luminescent wheel 101. The reflection mirror 144 reflects light in the blue wavelength range and guides its light axis to the collective lens 147. The third dichroic mirror 143 transmits the light in the blue wavelength range that is collected by the collective lens 147 to guide it towards a collective lens 173.

The light source side optical system 170 includes the collective lens 173, a light tunnel 175, a collective lens 178, a light axis turning mirror 181, a collective lens 183, a shining mirror 185, and a condenser lens 195. The condenser lens 195 emits image light emitted from the display device 51 disposed on a rear side of the condenser lens 195 towards the projection optical system 220, and therefore, the condenser lens 195 also constitutes part of the projection optical system 220.

The collective lens 173 is disposed at an end of the light tunnel 175 that lies to face the third dichroic mirror 143. The collective lens 173 collects light in the green wavelength range, light in the blue wavelength range and light in the red wavelength range that are guided from the third dichroic mirror 143. The lights in the green, blue and red wavelength ranges that are collected by the collective lens 173 are shined on to a color wheel 201 of the color wheel device 200.

Figure 3B:
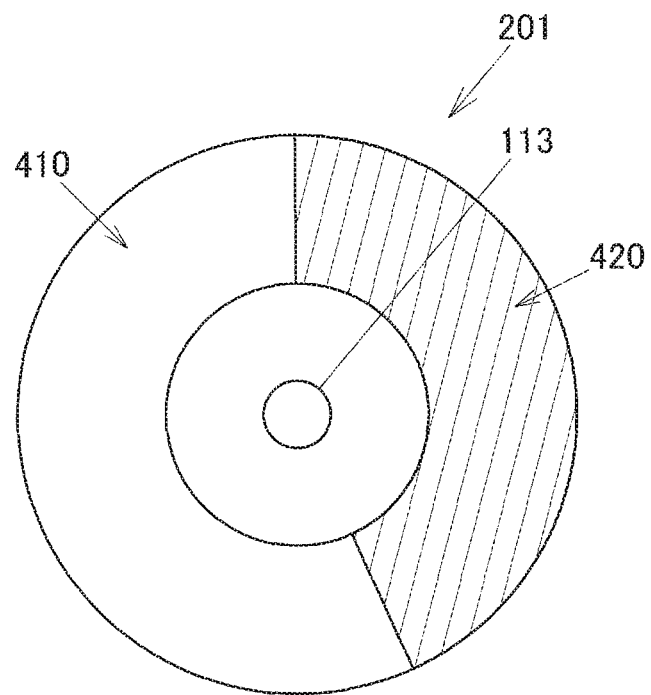
FIG. 3B is a drawing showing a color wheel of the projector according to the embodiment of the present invention.

The color wheel device 200 includes the color wheel 201 (a second wheel) and a motor 210 that drives the color wheel 201 rotationally, as shown in FIG. 3B. The color wheel 201 is disposed between the collective lens 173 and the light tunnel 175, and an axis of a pencil of light emitted from the collective lens 173 intersects a shining surface on the color wheel 201 at right angles.

The color wheel 201 has a circular disk shape and is driven rotationally by the motor 210 that is connected thereto via a bearing 113. The color wheel 201 includes an all color transmission area 410 and a blue and red transmission area 420 that are provided end to end in a circumferential direction. The all color transmission area 410 can transmit visible light including light in the red wavelength range, light in the green wavelength range, and light in the blue wavelength range. The blue and red transmission area 420 can transmit light in the blue wavelength range and light in the red wavelength range, as well as partial light of a longer wavelength in light in the green wavelength range. Light in the red wavelength range, light in the green wavelength range, and light in the blue wavelength range that are incident on the color wheel 201 are transmitted through the all color transmission area 410 or the blue and red transmission area 420 to be dimmed thereat and are then guided towards the light tunnel 175 as combined light 90. A pencil of light incident on the light tunnel 175 becomes a pencil of light whose luminous intensity is distributed uniformly within the light tunnel 175. As in the luminescent wheel 101, a marker is also formed on the color wheel 201 so that a rotation of the color wheel 201 is allowed to be detected through the marker (not shown). The marker can be formed on the surface on which light is incident on the color wheel 201 or on the opposite surface. The processor 38 acquires a detection signal by detecting the marker with an appropriate sensor such as a reflective light sensor to obtain a rotation frequency or a synchronizing point of the color wheel 201 from an interval or timing of the detection signal.

Referring to FIG. 2, again, the collective lens 178 and the light axis turning mirror 181 are disposed on an optical axis of the light tunnel 175. A pencil of light emerging from an emerging port of the light tunnel 175 is collected at the collective lens 178 and is then reflected towards a left panel by the light axis turning mirror 181.

The pencil of light reflected by the light axis turning mirror 181 is collected by the collective lens 183, whereafter the pencil of light is shined onto the display device 51, which is a digital micromirror device (DMD), at a predetermined angle via the condenser lens 195 by the shining mirror 185.

Combined light 90 that is shined on to an image forming surface of the display device 51 by the light source side optical system 170 is reflected on the image forming surface of the display device 51 and is then projected from a light emitting portion 12a on to a screen via the projection optical system 220 as image light. Here, the projection optical system 220 is made up of the condenser lens 195, and the movable lens group and a fixed lens group which are provided in a lens barrel 230. The lens barrel 230 is configured as a variable-focus lens and can be adjusted for zooming and focusing. The movable lens group is made to move automatically by the lens motor 45 or manually by a projected image control unit 15a.

With the projector 10 configured in the way described heretofore, when the luminescent wheel 101 and the color wheel 201 are rotated in synchronization with each other and light is emitted at arbitrary timings individually from the excitation light shining device 70 and the red light source device 120, lights in the green, blue and red wavelength ranges are incident on the collective lens 173 via the light guiding optical system 140 and are then incident on the display device 51 via the light source side optical system 170. As a result, the display device 51 displays green, blue and red lights in time division in accordance with data, thereby making it possible to project a color image on to the screen.

Figure 4:
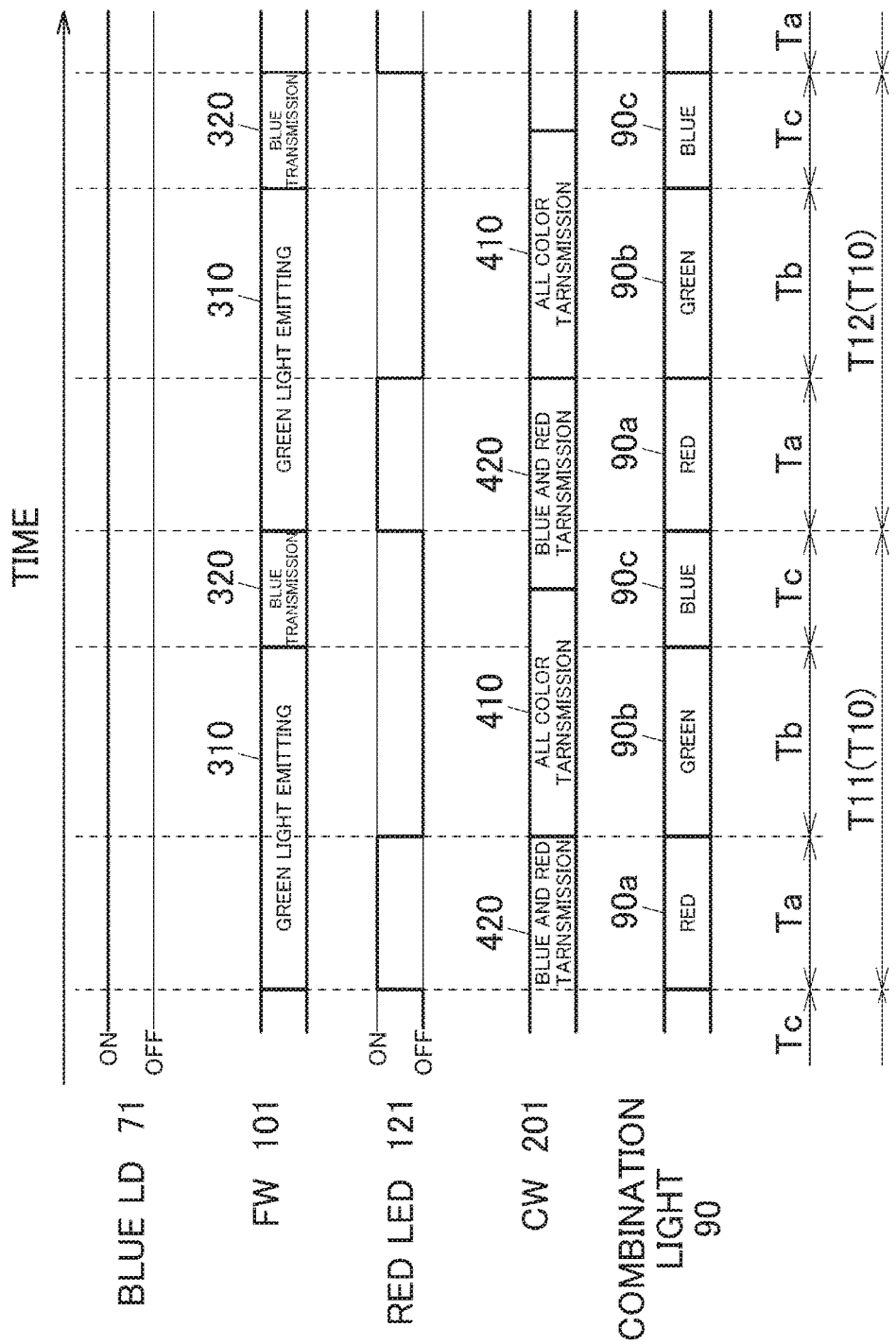
FIG. 4 is a timing chart of a projection operation executed by the projector according to the embodiment of the present invention.

FIG. 4 shows a timing chart of the light source unit 60. In a color-stressed mode shown in FIG. 4, a projected image formed by combined light 90 is projected from the projector 10 on to the screen, the combined light 90 being formed by combining three colors, that is, blue, green and red, of light. Image frames included in an input image are projected for each unit image frame T10. The projector 10 projects images in time division over a plurality of unit image frames T10.

The unit image frame T10 includes unit periods T11, T12 of two cycles. Operations in each of the unit periods T11, T12 correspond to one full rotational operation of the luminescent wheel 101 and the color wheel 201. In each of the unit terminals T11, T12, lights in different wavelength ranges are emitted sequentially in time division in the order of a first output period Ta, a second output period Tb and a third output period Tc. The light source unit 60 emits colors of light allocated in advance to the output periods Ta, Tb, Tc. Since the operation in the unit period T11 is the same as the operation in the unit period T12, here, the operation in the unit period T11 will mainly be described.

The blue laser diode 71 emits light in the blue wavelength range from the first output period Ta to the third output period Tc. The red light emitting diode 121 emits light in the red wavelength range in the first output period Ta and is turned off so as not to emit light in the red wavelength range in the second output period Tb and the third output period Tc.

In the first output period Ta, light in the blue wavelength range emitted from the blue laser diode 71 is shined on to the luminescent light emitting area 310 of the luminescent wheel 101, whereby light in the green wavelength range is emitted from the luminescent light emitting area 310. Light in the green wavelength range emitted from the luminescent light emitting area 310 is guided by the light guiding optical system 140 (refer to FIG. 2) and is then shined on to the blue and red transmission area 420 on the color wheel 201. The blue and red transmission area 420 transmits partial light of a longer wavelength in light in the green wavelength range.

Additionally, in the first output period Ta, light in the red wavelength range emitted from the red light emitting diode 121 is guided by the light guiding optical system 140 and is shined on to the blue and red transmission area 420 of the color wheel 201. Thus, the light source unit 60 guides light in the red wavelength range 90a into which light in the red wavelength range and partial light of a longer wavelength in light in the green wavelength range are combined to the light tunnel 175 as combined light 90 in the first output period Ta.

In the second output period Tb, light in the blue wavelength range outputted from the blue laser diodes 71 is shined on to the luminescent light emitting area 310 of the luminescent wheel 101, and light in the green wavelength range is emitted from the luminescent light emitting area 310. The light in the green wavelength range emitted from the luminescent light emitting area 310 is guided by the light guiding optical system 140 and is shined on to the all color transmission area 410 of the color wheel 201. Since the all color transmission area 410 transmits most of light in the green wavelength range, the light source unit 60 guides light in the green wavelength range 90b to the light tunnel 175 as combined light 90 in the second output period Tb.

In the third output period Tc, light in the blue wavelength range emitted from the blue laser diodes 71 is shined on to the transmission area 320 of the luminescent wheel 101, and the transmission area 320 transmits the light in the blue wavelength range shined on to it. The light in the blue wavelength range emitted from the transmission area 320 is guided by the light guiding optical system 140 and is shined on to the all color transmission area 420 of the color wheel 201. The light in the blue wavelength range emitted from the blue laser diodes 71 passes through the all color transmission area 410 in a former half of the third output period Tc and passes through the blue and red transmission area 420 in a latter half of the third output period Tc. Since both the all color transmission area 410 and the blue and red transmission area 420 transmit light in the blue wavelength range, the light source unit 60 guides the light in the blue wavelength range having passed through the color wheel 201 to the light tunnel 175 as combined light 90 in the third output period Tc.

When the third output period Tc of the unit period T11 elapses, a first output period Ta of the next unit period T12 starts. Since operations within the unit period T12 are performed similarly as in the unit period T11, the operations will not be described here. When the unit period T12 elapses, the operations in the unit image frame T10 are performed repeatedly.

The projector 10 is driven at a cycle which is double a frame of an input image. That is, a frequency of each of the unit periods T11, T12 is double a frame frequency of an input image. Consequently, one image frame corresponds to the two unit periods T11, T12 shown in FIG. 4. For instance, in the case that a frequency of an input image inputted into the projector 10 is 50 Hz (a frame rate is 50 fps), the unit periods T11, T12 are driven individually at 100 Hz. In the case that a frequency of an input image inputted into the projector 10 is 60 Hz (a frame rage is 60 fps), the unit periods T11, T12 are driven individually at 120 Hz. Hereinafter, in the present embodiment, a frequency which is double a frequency of an input image is referred to as a synchronizing frequency at which the luminescent wheel 101 is synchronized with the color wheel 201.

The luminescent wheel 101, the color wheel 201, and the display device 51 are driven in a synchronized fashion as follows. Firstly, when a signal of an input image is inputted into the processor 38 from the input/output connector unit 21 or the like (refer to FIG. 1), the processor 38 detects a frequency (a frame rate) of the input image.

The processor 38 drives the luminescent wheel 101 at a rotation frequency which is synchronized with a synchronizing frequency that corresponds to the frequency of the input image. In the present embodiment, the synchronizing frequency is set double the frequency of the input image, and a state in which the rotation frequency of the luminescent wheel 101 matches with the synchronizing frequency is referred to as a state in which the luminescent wheel is synchronized with the input image. In the case that the rotation frequency of the luminescent wheel 101 differs from the synchronizing frequency, the processor 38 changes the rotation frequency of the luminescent wheel 101 so as to match the rotation frequency with the synchronizing frequency.

The processor 38 drives the color wheel 201 at a rotation frequency which is synchronized with the rotation frequency of the luminescent wheel 101. At this time, the processor 38 drives the color wheel 201 and the luminescent wheel 101 so that a phase difference between the color wheel 201 and the luminescent wheel 101 becomes a phase different which is set for a projection mode. In the case that the rotation frequency of the color wheel 201 differs from the rotation frequency of the luminescent wheel 101, or in the case that the shift difference between the color wheel 201 and the luminescent wheel 101 shifts from the set shift difference, the processor 38 drives the color wheel 201 so that the rotation frequency of the color wheel 201 coincides with the rotation frequency of the luminescent wheel 101 to eliminate a phase sift.

The processor 38 causes the display device 51 to form image light in synchronization with the rotation frequency of the luminescent wheel 101. In the case that a driving frequency of the display device 51 differs from the rotation frequency of the luminescent wheel 101, the driving frequency of the display device 51 is changed so as to coincide with the rotation frequency of the luminescent wheel 101.

In the case that the light source unit 60 operates in such a state that the luminescent wheel 101 and the color wheel 201 are in proper synchronization with each other according to a timing chart shown in FIG. 4, the display device 51 (refer to FIG. 2) can form a color image by controlling emission times (reflection times) of light in the red wavelength range 90a, light in the green wavelength range 90b, and light in the blue wavelength range 90c in the first output period Ta, the second output period Tb, and the third output period Tc, respectively.

In case of a synchronization error being caused between the luminescent wheel 101 and the color wheel 201, the display device 51 emits unintentional light, and hence, as an image to be projected on to a screen, an image which differs from the input image inputted into the projector 10 is projected on to the screen. In case of a synchronization error like the one described above being caused, the projector 10 performs a masking process, which will be described below, to prevent a projected image from flickering.

Figure 5:
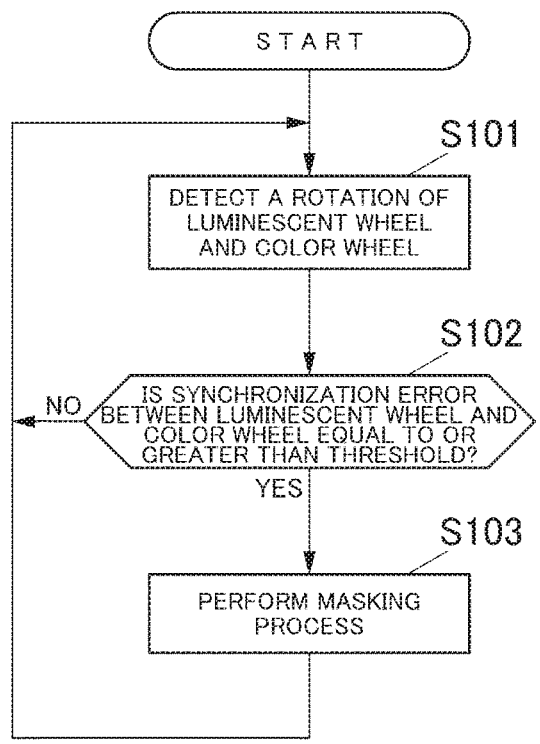
FIG. 5 is a flow chart of a masking operation according to the embodiment of the present invention.

FIG. 5 is a flow chart of a masking process to be performed by the projector 10. In step S101, the processor 38 detects a rotation of each of the luminescent wheel 101 and the color wheel 201. The processor 38 causes the sensors to detect the markers provided on the luminescent wheel 101 and the color wheel 201 and obtains rotation frequencies and phases of the luminescent wheel 101 and the color wheel 201. For instance, a rotation frequency can be obtained by a detection intervals of detection signals, and a phase can be obtained by a detection timing of a detection signal corresponding to the position of the marker. The processor 38 can obtain a phase difference from the phases of the luminescent wheel 101 and the color wheel 201 that are so obtained.

In step S102, the processor 38 determines whether a synchronization error between the luminescent wheel 101 and the color wheel 201 is equal to or greater than a threshold. For instance, a first threshold to be compared with a rotation frequency difference and a second threshold to be compared with a phase difference are stored in advance in the projector 10. Then, in the case that a rotation frequency difference between the luminescent wheel 101 and the color wheel 201 is equal to or greater than the first threshold, or in the case that a phase sift between the luminescent wheel 101 and the color wheel 201 is equal to or greater than the second threshold, the processor 38 determines that a synchronization error is occurring and then proceeds to an operation in step S103. The phase shift represents a shift between an actual phase difference between the luminescent wheel 101 and the color wheel 201 and a target value of a phase difference that is set for a projection mode or the like. For example, in the case that a target value of a phase difference between the luminescent wheel 101 and the color wheel 201 in the normal state shown in FIG. 4 is 0 degree, it can be determined that a phase shift is occurring when an actual phase difference detected by the sensors advances or delays from 0 degree. In the case that the rotation frequency of the luminescent wheel 101 differs from the rotation frequency of the color wheel 201, a state in which the phase advances momentarily or a state in which the phase delays momentarily occurs irregularly.

The processor 38 may determine that a synchronization error is occurring when the rotation frequency difference between the luminescent wheel 101 and the color wheel 201 is equal to or greater than the first threshold and when the phase shift between the luminescent wheel 101 and the color wheel 201 is equal to or greater than the second threshold. The processor 38 returns to the operation in step S101 in the case that it is determined that no synchronization error occurs.

In step S103, the processor 38 performs a masking process on projected image light. As a masking process method, the blue laser diodes 71 and the red light emitting diode 121, which are the light source devices, can be turned off. Alternatively, image light projected by the display device 51 can be a black image.

The processor 38 may perform the making process for each of the unit periods T11, T12 or for each unit image frame T10 shown in FIG. 4. Alternatively, the processor 38 may perform the masking process in a partial period (a period Td and a period Te in timing charts shown in FIGS. 6 and 7) during which unintentional light is emitted due to an occurrence of a rotation frequency difference or a phase shift between the luminescent wheel 101 (a first wheel) and the color wheel 201 (a second wheel) in light in the difference wavelength ranges such as light in the red wavelength range 90a, light in the green wavelength range 90b, and light in the blue wavelength range 90c. Further, in the present embodiment, as the masking process, a so-called blue image may be projected as a projected image by causing light in the blue wavelength range, which affects almost in no way a color of light that is emitted even though a phase shift occurs, to be emitted in the third output period Tc, while turning off the red and blue light source devices so as not to emit light in the red wavelength range in the first output period Ta and light in the green wavelength range in the second output period Tb, respectively. Alternatively, the brightness of image light may be reduced by controlling the display device 51 as the masking process.

When the masking process is performed in the projector 10 in such a case that it is determined that no synchronization error occurs because a rotation frequency F1 and a phase shift P1 are both less than the thresholds (the first threshold and the second threshold) in step S102 (NO in step S102), the processor 38 cancels the masking process and returns to the operation in step S101 to resume the operation of projecting the input image on to the screen.

Figure 6:
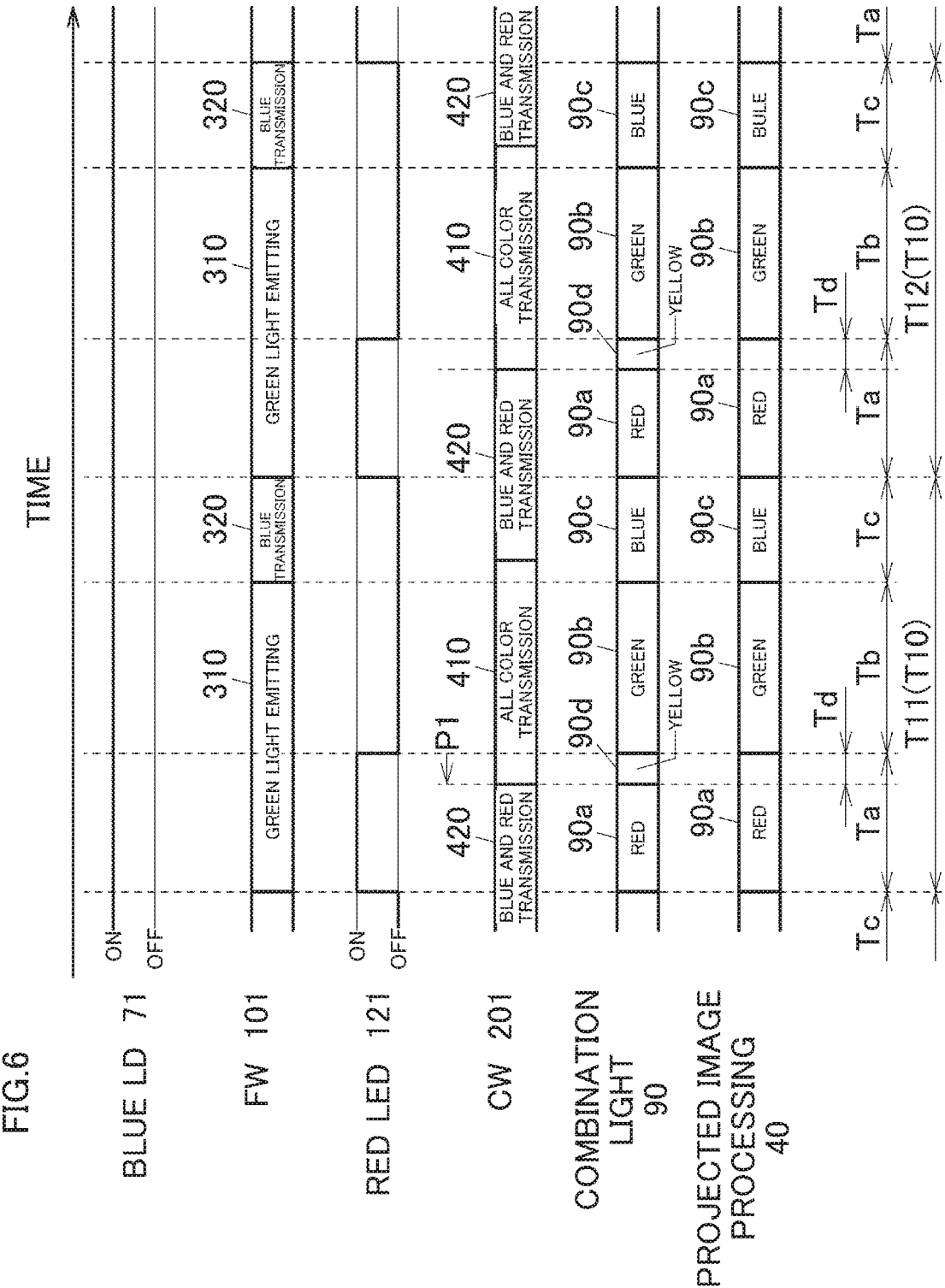
FIG. 6 is a timing chart of a projection operation executed by the projector according to the embodiment of the present invention when a phase of the color wheel advances to thereby generate a synchronization shift.

Next, operations for a state in which a phase shift P1 is occurring as a result of a synchronization error occurring between the luminescent wheel 101 and the color wheel 201 will be described. FIG. 6 shows a timing chart for a state in which the color wheel 201 advances further in phase than the luminescent wheel 101 while the projector 10 is driven in the color-stressed mode shown in FIG. 4.

When the color wheel 201 advances further in phase than the luminescent wheel 101, a phase shift P1 occurs in which the all color transmission area 410 is positioned in a period Td constituting a portion in a latter half of the first output period Ta. Consequently, light in a yellow wavelength range 90d is emitted in the period Td constituting the portion of the first output period Ta as combined light 90. As shown at a projected image processing 40, since the display device 51 is driven on the premise that light in the red wavelength range 90a is emitted over the whole of the first output period Ta, red in a projected image becomes yellowish as a result of the light in the yellow wavelength range 90d being mixed with the light in the red wavelength range 90a in the partial period Td. Alternatively, in the case that a color of white is projected, a component in a wavelength range close to the green wavelength range is increased, whereby a color of greenish white is projected.

Figure 7:
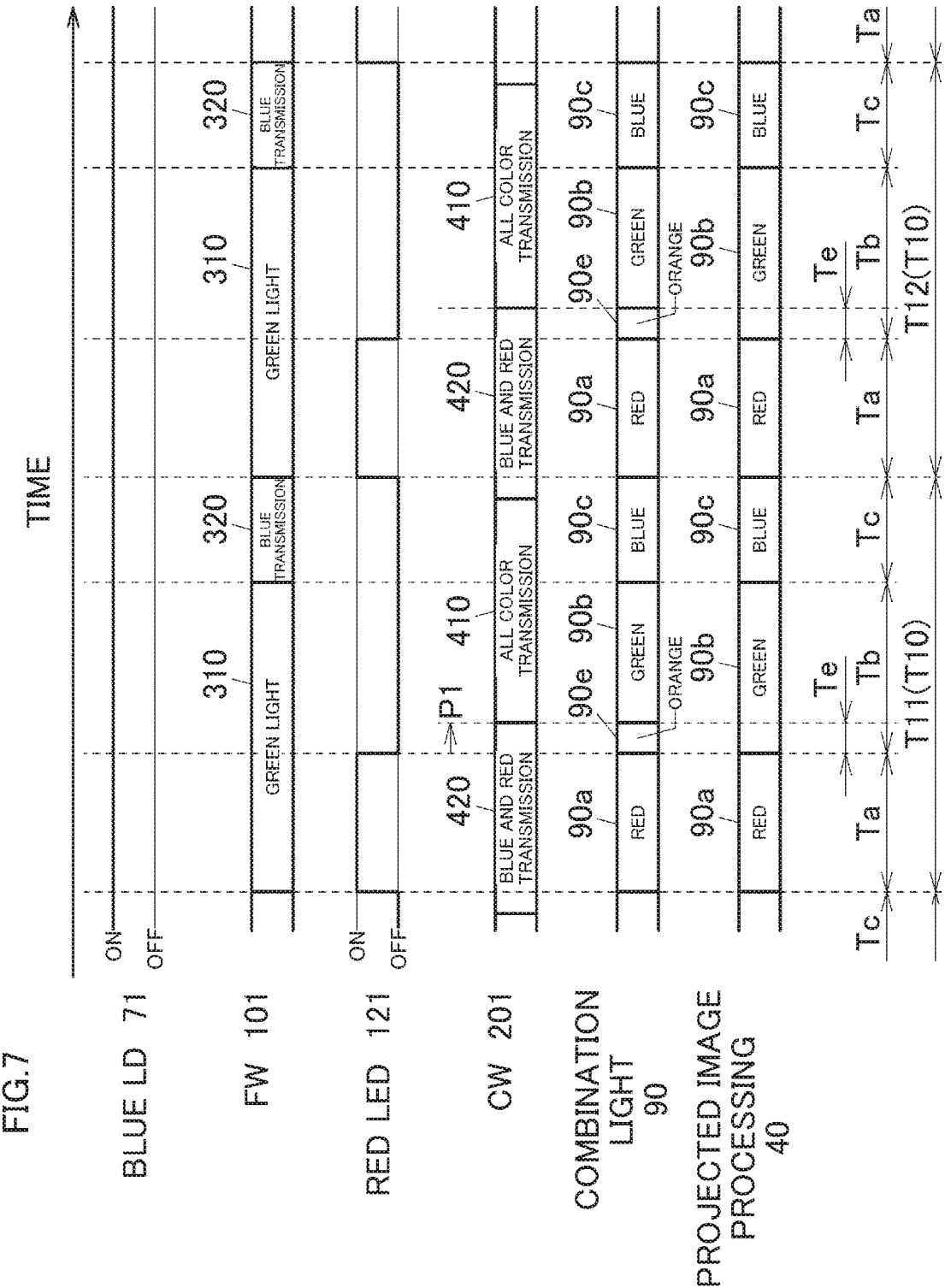
FIG. 7 is a timing chart of a projection operation executed by the projector according to the embodiment of the present invention when the phase of the color wheel delays to thereby generate a synchronization shift.

FIG. 7 is a timing chart for a state in which the color wheel 201 delays further in phase than the luminescent wheel 101 while the projector 10 is driven in the color-stressed mode shown in FIG. 4. When the color wheel 201 delays further in phase than the luminescent wheel 101, a phase shift P1 occurs in which the blue and red transmission area 420 is positioned in a period Te constituting a portion of the second output period Tb. Consequently, in the period Te constituting the portion of the second output period Tb, a component of light in the green wavelength range emitted from the luminescent light emitting area 310 which lies close to a short wavelength side of the light in the green wavelength range is removed by the blue and red transmission area 420, whereby light in an orange wavelength range 90e is emitted as combined light 90. As shown at the projected image processing 40, since the display device 51 is driven on the premise that light in the green wavelength range 90b is emitted over the whole of the second output period Tb, green in a projected image becomes yellowish as a result of the light in the orange wavelength range 90e being mixed with the light in the green wavelength range 90b in the partial period Te. Alternatively, in the case that a color of white is projected, a component in a wavelength range close to the red wavelength range is increased, whereby a color of reddish white is projected. Then, in case of the phase shifts P1 shown in FIGS. 7 and 8 changing irregularly, the whole of the projected image appears flickering from time to time.

The synchronization error between the luminescent wheel 101 and the color wheel 201 described above occurs in changing the rotation frequencies of the luminescent wheel 101 and the color wheel 201 as a result of, for instance, a change in the frequency of the input image inputted into the projector 10.

Figure 8:
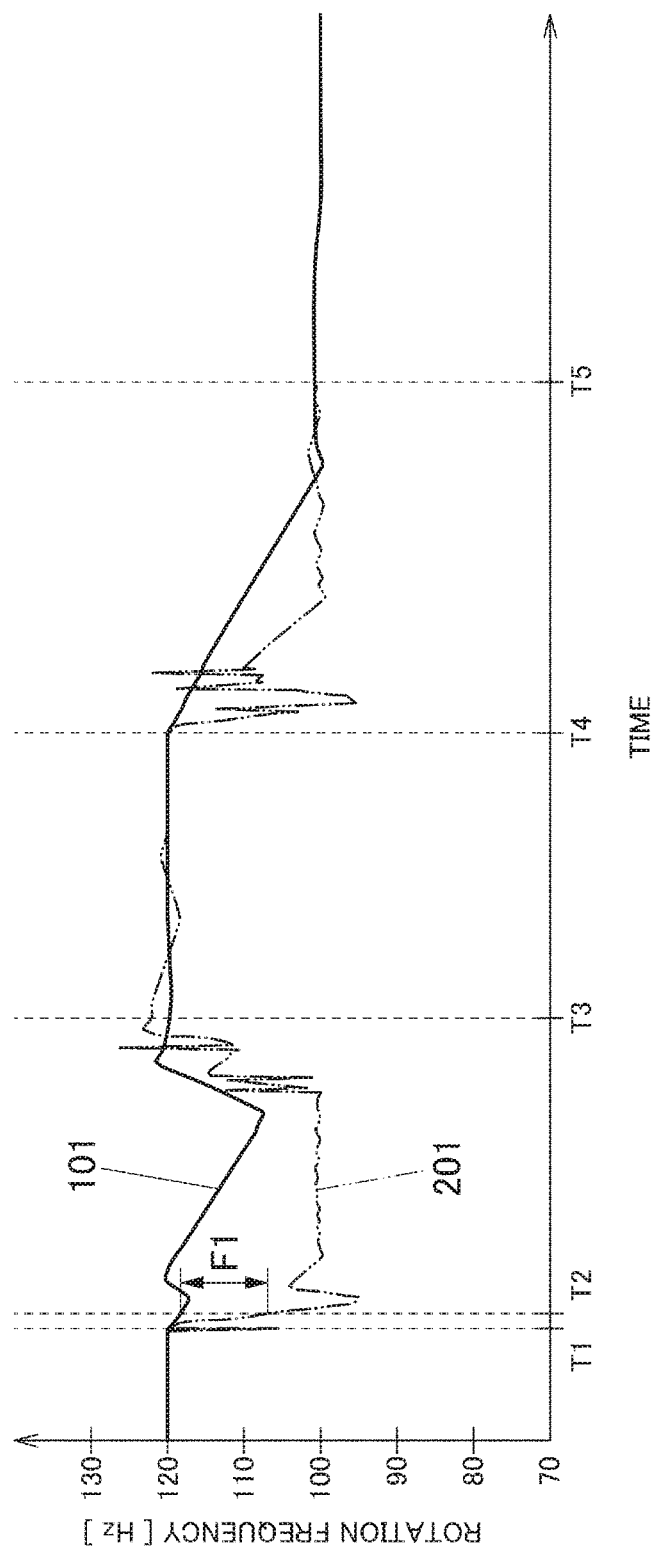
FIG. 8 is a drawing showing changes in revolution speeds of the luminescent wheel and the color wheel according to the embodiment of the present invention.

FIG. 8 is a drawing showing examples of changes in rotation frequency of the luminescent wheel 101 and the color wheel 201 when a frequency of an input image changes from 60 Hz at which the input image is inputted to 50 Hz. In the drawing, an axis of ordinates denotes rotation frequency, while an axis of abscissas denotes time. Additionally, a rotation frequency of the luminescent wheel 101 is indicated by a solid line, while a rotation frequency of the color wheel 201 is indicated by a chain double-dashed line.

A frequency of an input image is kept at 60 Hz until a timing T1, and the luminescent wheel 101 and the color wheel 201 continue rotating at 120 Hz while being synchronized with each other until then. Then, when the frequency of the input image changes from 60 Hz to 50 Hz at the timing T1, rotation frequencies of the luminescent wheel 101 and the color wheel 201 change towards a synchronizing frequency of 100 Hz that corresponds to the frequency of the input image which is now 50 Hz. Response speeds of the luminescent wheel 101 and the color wheel 201 to the synchronizing frequency may be caused to differ from each other due to respective weights or the like of the luminescent wheel 101 and the color wheel 201. In FIG. 8, since the color wheel 201 is lighter than the luminescent wheel 101, the rotation frequency of the color wheel 201 changes more quickly than the rotation frequency of the luminescent wheel 101. Consequently, a rotation frequency difference F1 of the order of 10 Hz occurs at a timing T2.

When this rotation frequency difference F1 is equal to or greater than the first threshold that is set in advance (S102), determining that a synchronization error occurs, the processor 38 performs the masking process (S103) and can continue the masking process during a period from the timing T2 to a timing T3 during which the rotation frequency difference F1 remains relatively great (S101 to S103). Additionally, the luminescent wheel 101 and the color wheel 201 are released from the synchronization with the input image at the timing T3 and hence are driven at 120 Hz, which is their free running frequency. Because of this, the luminescent wheel 101 and the color wheel 201 are driven at about 120 Hz during a period from the timing T3 to a timing T4, whereby the rotation frequency difference F1 becomes small. The processor 38 can cancel the masking process during the period from the timing T3 to the timing T4 or cancel the masking process during a latter half period of the period from the timing T3 to the timing T4 during which the rotation frequency difference F1 gets smaller to be stabilized by setting the first threshold as required.

Since the luminescent wheel 101 and the color wheel 201 are caused to be driven at the synchronizing frequency of 100 Hz again from the timing T4, the rotation frequencies of the luminescent wheel 101 and the color wheel 201 start changing towards 100 Hz. Thus, the rotation frequency difference F1 increases again. The processor 38 performs the masking process (S103) during a period from the timing T4 to a timing T5 during which the processor 38 determines that the rotation frequency difference F1 is equal to or greater than the first threshold (S102). Then, since the rotation frequencies of the luminescent wheel 101 and the color wheel 201 come to coincide substantially with the synchronizing frequency which is 100 Hz at the timing T5, whereby the luminescent wheel 101 and the color wheel 201 are synchronized with each other (NO in S102), the processor 38 cancels the masking process and can resume the projection of the input image. In the description that has been made heretofore by use of FIG. 8, although the frequency of the input image is described as changing to be reduced from 60 Hz to 50 Hz, even in the case that the frequency of the input image changes to be increased from 50 Hz to 60 Hz, the masking process may be performed by determining on the rotation frequency difference F1 or the phase shift P1.

Although the changes in rotation frequency are described in FIG. 8, a phase shift P1 also occurs during the period from the timing T1 to the timing T3 and the period from the timing T4 to the timing T5 during which the rotation frequency difference F1 occurs, and it can also be determined that a synchronization error occurs when the phase shift P1 is equal to or greater than the second threshold (YES in S102).

Additionally, since the luminescent wheel 101 and the color wheel 201 are driven at their free running frequencies during the period from the timing T3 to the timing T4, the rotation frequency difference F1 is small, but a great phase shift P1 may be occurring from time to time during those periods. Consequently, the processor 38 can perform the masking process (S103) even during the period from the timing T3 to the timing T4 when the phase shift P1 occurring is equal to or greater than the second threshold (YES in S102).

In the case that a synchronization error occurs between the input image and the luminescent wheel 101 while the luminescent wheel 101 is normally synchronized with the color wheel 201, the drawing timing of the input image does not correspond to the unit image frame T10. However, in that case, the synchronization error can be corrected apparently by removing part of an image that is projected on to the unit image frame T10 from the input image or making a copy of the input image to display the same image frame continuously.

In the present embodiment, although the color-stressed mode is described in which image light is formed by emitting the three colors of light into the unit image frame T10 as shown in FIG. 4, the color wheel 201 may be driven in such a manner as to generate a predetermined phase difference intentionally between the luminescent wheel 101 and the color wheel 201. As a result, a projected image can be formed by diving a single unit period T11, T12 into four or more periods. For instance, the color wheel 201 is caused to advance further in phase than the luminescent wheel 101, whereby as shown in FIG. 6, light in the red wavelength range can be emitted as combined light 90 in a former half of the first output period Ta, while a latter half of the first output period Ta constitutes a fourth output period (a period Td) from which light in the yellow wavelength range can be emitted as combined light 90. The display device 51 is driven on the premise that light in the yellow wavelength range is emitted in the period Td as an image projecting operation. In this way, the projector 10 can operate in an luminance-stressed mode in which image light is formed by the four colors of light, that is, light in the red wavelength range 90a, light in the yellow wavelength range 90d, light in the green wavelength range 90b, and light in the blue wavelength range 90c which are emitted as combined light 90.

In the mode in which the three colors of light are emitted in the unit periods T11, T12 individually, or in the mode in which the four colors of light are emitted in the unit periods T11, T12 individually, the blue laser diodes 71 may be turned off at the timing at which light in the red wavelength range is emitted as combined light 90 in the first output period Ta.

The present embodiment may be applied to a projector in which three or more luminescent wheels or color wheels are driven in a synchronized fashion.

Additionally, the application of the present embodiment is not limited to the projector 10, and hence, the present embodiment may be applied to a computer including a first light source device configured to emit light in a first wavelength range, a first wheel (a luminescent wheel 101) on which a plurality of light source segments are formed, the plurality of light source segments being configured to emit lights in different wavelength ranges upon receiving light in the first wavelength range shined thereon, a second wheel (a color wheel 201) on which a plurality of areas are formed, the plurality of areas being configured to dim light emitted from the first wheel, and a display device 51 onto which light emitted from the second wheel is shined to thereby form image light. A program executed by the computer can be stored in a storage unit provided in an interior of the computer, and the computer can be made to function as a processor configured to control the first light source device, the first wheel and the second wheel in a synchronized fashion and to perform a masking process on image light when either or both of a rotation frequency difference F1 and a phase shift P1 are equal to or greater than predetermined thresholds.

Thus, the projector 10 described in the present embodiment includes the first wheel (the luminescent wheel 101) on which the plurality of light source segments are formed, the plurality of light source segments being configured to emit lights in the different wavelength ranges upon receiving light in the first wavelength range emitted from the first light source device, the second wheel (the color wheel 201) on which the plurality of areas are formed, the plurality of areas being configured to dim light emitted from the first wheel, the display device 51 onto which light emitted from the second wheel is shined to thereby form image light, and the processor 38 configured to control the light source device, the first wheel, and the second wheel in a synchronized fashion. Additionally, the processor 38 performs the masking process on image light when either or both of the rotation frequency difference F1 and the phase shift P1 are equal to or greater than the predetermined thresholds.

As a result of the projector 10 or the computer performing the projection control method described above, the masking process can be performed on the projected image whose colors are not displayed properly due to the synchronization error only for a required period of time, thereby making it possible to reduce the flickering of the projected image.

The projector 10 is configured to cancel the masking process when both the rotation frequency difference F1 and the phase shift P1 are less than the thresholds, whereby the projector 10 can detect an elimination of synchronization error quickly so as to resume the projection of the projected image.

In the projector 10, lights in the different wavelength ranges are emitted in the unit periods T11, T12, and the masking process is performed in the partial periods Td, Te of the unit periods T11, T12 during which unintentional light is emitted. With the projector 10 configured in this way, image light can continue to be projected while the flickering of the projected image is reduced.

In the projector 10, as the masking process, the first light source device is turned off, or image light projected by the display device 51 is made to form a black image. With the projector 10 configured in this way, image light which is not normal can be prevented from being projected on to a screen.

In the projector 10, as the masking process, the brightness of image light is reduced. With the projector 10 configured in this way, image light that is not projected properly can be made inconspicuous so as to reduce the flickering of the projected image.

The first wheel includes the first transmission area which transmits light in the first wavelength range and the luminescent light emitting area 310 onto which light in the first wavelength range is shined to thereby emit light in the second wavelength range as luminescent light, the first transmission area and the luminescent light emitting area 310 being provide end to end in the circumferential direction, and the projector 10 includes further the second light source device configured to emit light in the third wavelength range. The second wheel includes the second transmission area which transmits light in the first wavelength range to light in the third wavelength range and the third transmission area which transmits light in the first wavelength range, light in the third wavelength range, and a portion of light in the second wavelength range which lies close to a long wavelength side thereof, the second transmission area and the third transmission area being provided end to end in the circumferential direction. This enables lights in the three wavelength ranges (for instance, as described in the present embodiment, light in the red wavelength range, light in the green wavelength range, and light in the blue wavelength range) to be emitted.

In the embodiment that has been described heretofore, while the second wheel includes the plurality of transmission areas formed thereon to dim light emitted from the first wheel, the present invention is not limited to this configuration. The second wheel may include a plurality of reflection areas formed thereon to dim light emitted from the first wheel. In the embodiment that has been described heretofore, while the two wheels of the first wheel and the second wheel are described as being provided for use, the present invention is not limited to this configuration, and hence, three or more wheels may be provided for use.

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A projector comprising:
   a first light source device configured to emit light in a first wavelength range;
   a first wheel on which a plurality of light source segments are formed, the plurality of light source segments being configured to emit lights in different wavelength ranges upon receiving light in the first wavelength range shined thereon;
   a second wheel on which a plurality of areas are formed, the plurality of areas being configured to dim light emitted from the first wheel;
   a display device onto which light emitted from the second wheel is shined to thereby form image light; and
   a processor configured to control the first light source device, the first wheel and the second wheel in a synchronized fashion,
   wherein the processor performs a masking process on the image light when either or both of a rotation frequency difference and a phase shift between the first wheel and the second wheel are equal to or greater than predetermined thresholds.

2. The projector according to claim 1,
   wherein the processor cancels the masking process when both the rotation frequency difference and the phase shift are less than the thresholds.

3. The projector according to claim 1,
   wherein the processor emits lights in the different wavelength ranges sequentially in time division within a unit period, and
   wherein the processor performs the masking process in a partial period in the unit period during which an unintentional color of light is emitted.

4. The projector according to claim 2,
   wherein the processor emits lights in the different wavelength ranges sequentially in time division within a unit period, and
   wherein the processor performs the masking process in a partial period in the unit period during which an unintentional color of light is emitted.

5. The projector according to claim 1,
   wherein the processor turns off the first light source device or causes the image light projected by the display device to form a black image as the masking process.

6. The projector according to claim 2,
   wherein the processor turns off the first light source device or causes the image light projected by the display device to form a black image as the masking process.

7. The projector according to claim 3,
   wherein the processor turns off the first light source device or causes the image light projected by the display device to form a black image as the masking process.

8. The projector according to claim 4,
   wherein the processor turns off the first light source device or causes the image light projected by the display device to form a black image as the masking process.

9. The projector according to claim 1,
   wherein the processor reduces a brightness of the image light as the masking process.

10. The projector according to claim 2,
    wherein the processor reduces a brightness of the image light as the masking process.

11. The projector according to claim 3,
    wherein the processor reduces a brightness of the image light as the masking process.

12. The projector according to claim 4,
    wherein the processor reduces a brightness of the image light as the masking process.

13. The projector according to claim 1,
    wherein the first wheel comprises, as the light source segments, a first transmission area configured to transmit light in the first wavelength range and a luminescent light emitting area onto which light in the first wavelength range is shined to thereby emit light in a second wavelength range as luminescent light, the first transmission area and the luminescent light emitting area being provided end to end in a circumferential direction.

14. The projector according to claim 2,
    wherein the first wheel comprises, as the light source segments, a first transmission area configured to transmit light in the first wavelength range and a luminescent light emitting area onto which light in the first wavelength range is shined to thereby emit light in a second wavelength range as luminescent light, the first transmission area and the luminescent light emitting area being provided end to end in a circumferential direction.

15. The projector according to claim 13, comprising further:
    a second light source device configured to emit light in a third wavelength range which differs from light in the first wavelength range and light in the second wavelength range.

16. The projector according to claim 14, comprising further:

a second light source device configured to emit light in a third wavelength range which differs from light in the first wavelength range and light in the second wavelength range.

17. The projector according to claim 15,
wherein the second wheel comprises a plurality of transmission areas formed thereon, the plurality of transmission areas comprising a second transmission area configured to transmit light in the first wavelength range to light in the third wavelength range and a third transmission area configured to transmit light in the first wavelength range, light in the third wavelength range, and partial light of light in the second wavelength range which lies close to a long wavelength side thereof, the second transmission area and the third transmission area being provided end to end in a circumferential direction.

18. The projector according to claim 16,
wherein the second wheel comprises a plurality of transmission areas formed thereon, the plurality of transmission areas comprising a second transmission area configured to transmit light in the first wavelength range to light in the third wavelength range and a third transmission area configured to transmit light in the first wavelength range, light in the third wavelength range, and partial light of light in the second wavelength range which lies close to a long wavelength side thereof, the second transmission area and the third transmission area being provided end to end in a circumferential direction.

19. A projection control method for a projector,
the projector comprising:
a first light source device configured to emit light in a first wavelength range;
a first wheel on which a plurality of light source segments are formed, the plurality of light source segments being configured to emit lights in different wavelength ranges upon receiving light in the first wavelength range shined thereon;
a second wheel on which a plurality of areas are formed, the plurality of areas being configured to dim light emitted from the first wheel; and
a display device onto which light emitted from the second wheel is shined to thereby form image light;
the projection control method comprising:
a processor configured to control the first light source device, the first wheel and the second wheel in a synchronized fashion and to perform a masking process on the image light when either or both of a rotation frequency difference and a phase shift between the first wheel and the second wheel are equal to or greater than predetermined thresholds.

20. A non-transitory storage medium that can be read by a computer, the computer comprising:
a first light source device configured to emit light in a first wavelength range;
a first wheel on which a plurality of light source segments are formed, the plurality of light source segments being configured to emit lights in different wavelength ranges upon receiving light in the first wavelength range shined thereon;
a second wheel on which a plurality of areas are formed, the plurality of areas being configured to dim light emitted from the first wheel; and
a display device onto which light emitted from the second wheel is shined to thereby form image light;
the storage medium configured to cause the computer to function as a processor configured to control the first light source device, the first wheel and the second wheel in a synchronized fashion and to perform a masking process on the image light when either or both of a rotation frequency difference and a phase shift between the first wheel and the second wheel are equal to or greater than predetermined thresholds.

* * * * *